Feb. 4, 1958  A. D. LA RUE  2,822,497
BUSHING FOR MAGNETRON

Filed Oct. 4, 1955  2 Sheets-Sheet 1

INVENTOR.
ALBERT D. LARUE
BY George Sipkin
ATTORNEYS

Feb. 4, 1958   A. D. LA RUE   2,822,497
BUSHING FOR MAGNETRON

Filed Oct. 4, 1955                    2 Sheets-Sheet 2

INVENTOR.
ALBERT D. LaRUE
BY George Sipkin
Lee J. Hintzberger
ATTORNEYS

United States Patent Office 2,822,497
Patented Feb. 4, 1958

2,822,497
BUSHING FOR MAGNETRON

Albert D. LaRue, Lexington, Mass., assignor, by mesne assignments, to the United States of America as represented by the Secretary of the Navy Application October 4, 1955, Serial No. 538,547

2 Claims. (Cl. 313—240)

This invention relates to a high voltage bushing and, more particularly, to a high voltage bushing which may be employed to support the cathode and the cathode magnetic pole of a magnetron.

It is contemplated that the bushing herein described be utilized in electron discharge devices, such as magnetrons, operating at extremely high voltages, i. e., in the order of 140 kilovolts. Devices operating at such high voltages require a very high vacuum, necessitating very high bakeout temperatures in the processing thereof. It is therefore desirable to employ a bushing composed of a refractory ceramic, which can withstand this very high bakeout temperature, rather than a glass bushing. The use of a ceramic bushing makes necessary metal-ceramic vacuum seals. The discontinuities produced by such seals make the seals particularly susceptible to breakdown in the intense electric fields which result from the extremely high voltage contemplated by this invention. It is therefore necessary to shield the regions of the seals in order to minimize the intensity of the electric field existing in the vicinity thereof. Furthermore, the bushing is immersed in an oil bath to prevent breakdown at the high voltage employed.

It is therefore an object of this invention to provide a bushing to be employed in an electron discharge device, such as a magnetron, which permits higher bakeout temperatures in tube processing when used in conjunction with a metal-brazed ceramic output window.

It is a further object of this invention to provide a ceramic bushing which permits a more "rugged" cathode mount in a high voltage magnetron than is possible with an air bushing.

It is a still further object of this invention to provide a ceramic bushing which permits considerable reduction in size from the dimensions required of an air bushing.

It is a still further object of this invention to provide a ceramic bushing for a magnetron tube which may be bomber or furnace brazed in tube assembly operations, to permit the assembly of a much cleaner tube than is possible with a glass bushing.

Figure 2:
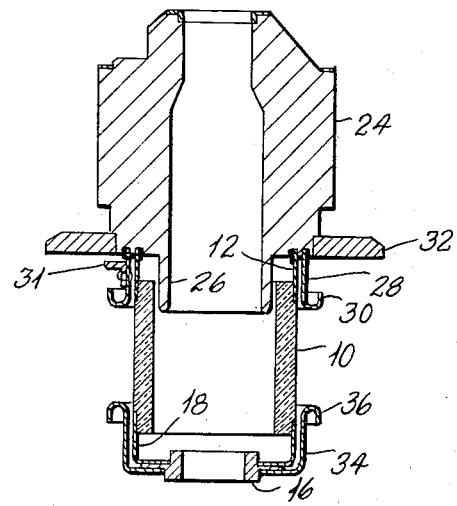
Figure 1:
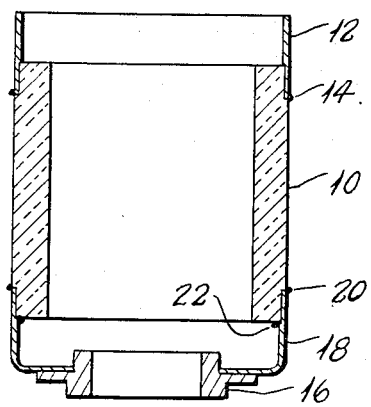
Figure 3:
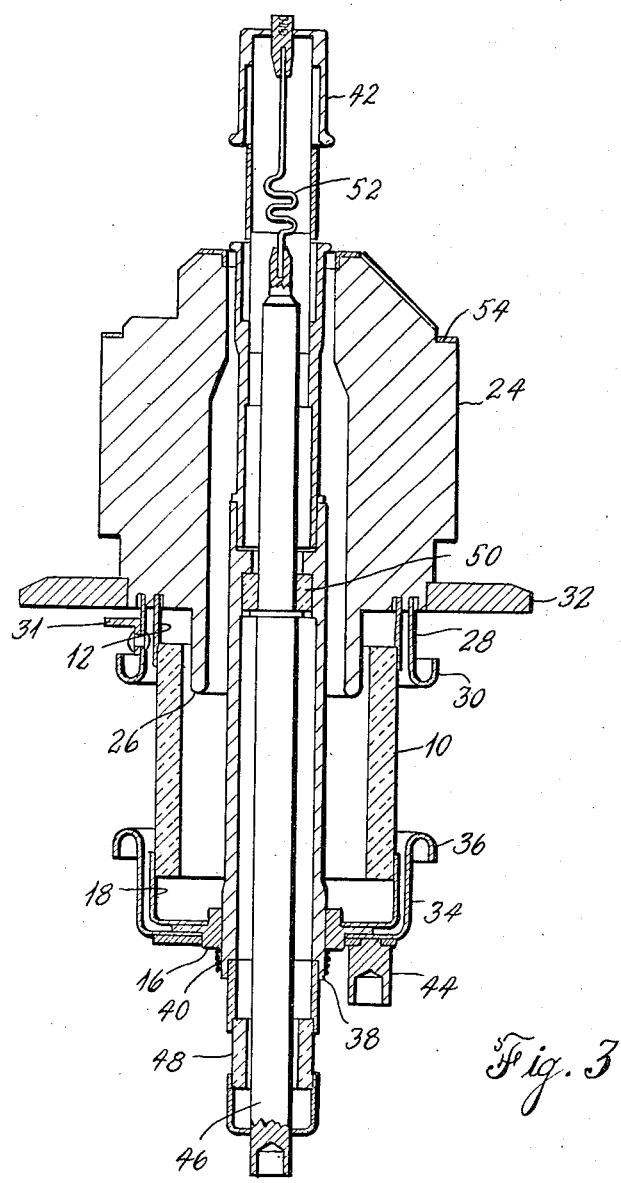

Other objects and many of the attendant advantages of this invention will be readily appreciated as the same becomes better understood by reference to the following detailed description when considered in connection with the accompanying drawings wherein:

Fig. 1 is a sectional view of the bushing itself with its metal end fittings in place, Fig. 2 is a sectional view showing the subassembly of Fig. 1 with the cathode magnetic pole and corona shields in place, and Fig. 3 is a sectional view showing the entire assembly, incorporating the subassembly of Fig. 2.

Referring now to Fig. 1, there is shown ceramic bushing 10 which has portions of its outer surface near either end thereof metalized. Contiguous with the top metalized portion of bushing 10 is an annular ring 12, forming a sleeve, composed of Kovar. A ring of solder 14 circles the bottom junction of ring 12 and bushing 10.

Metallic element 16, which is spaced from bushing 10, as shown, is connected to the bottom metalized portion of bushing 10 by cap portion 18, which has an L-shaped cross-section. Solder rings 20 and 22, respectively, are arranged as shown at the top and bottom junctions of cap portion 18 and bushing 10.

The top and bottom metalized portions of bushing 10 are heated to melt solder rings 14, 20 and 22, respectively, to thereby bond, by brazing, ring 12 and cap portion 18, respectively to bushing 10.

Referring now to Fig. 2, wherein like reference numerals are employed to identify the corresponding elements shown in Fig. 1, there is shown metallic element 24, which is configured to provide the cathode magnetic pole of a magnetron. Metallic element 24 is spaced from bushing 10 and is connected thereto by ring 12, as shown. Ring 26 extending from metallic element 24 forms an inner shield for the bond between bushing 10 and ring 12. Ring 28, suspended from metallic element 24, and spaced from ring 12, as shown, forms an outer shield for the bond between ring 12 and bushing 10. Ring 28 incorporates a termination having a U-shaped cross-section 30, as shown. Terminal 31, which is connected to metallic element 24, is adapted for applying a potential thereto. Extending radially from metallic element 24 is flange 32, which forms a cover for the oil bath, not shown, in which bushing 10 is immersed. A "jiffy" clamp and a compressed "O-ring," not shown, are used to make a tight seal between flange 32 and the oil bath.

A second cap portion 34, incorporating a termination 36 having a U-shaped cross-section, is connected to metallic element 16 and forms an outer shield for the bond between the bushing 10 and cap portion 18.

The U-shaped cross-sections on terminations 30 and 36 of ring 28 and second cap portion 34, respectively, face each other, as shown, and are spaced at a sufficient distance from each other to prevent breakdown therebetween (at least 1.25 inches when 140 kilovolts exists between metal elements 16 and 24). Terminations 30 and 36, respectively, also serve to prevent corona.

Referring now to Fig. 3, wherein like reference numerals are employed to identify corresponding elements shown in Figs. 1 and 2, there is shown metallic element 38 which is sealed to metallic element 16 by means of solder ring 40. Metallic element 38 passes through the bore of bushing 10 and metallic element 24, as shown, supporting cathode 42 on the end thereof which protrudes from metallic element 24. Connected to second cap portion 54 is terminal 44 adapted for applying a potential to metallic elements 16 and 38 and to cathode 42. A heater conductor 46, which is supported by ceramic spacers 48 and 50, respectively, supports heater 52.

When the entire assembly shown in Fig. 3 is incorporated in a magnetron, the anode of the magnetron, not shown, is sealed at point 54, and the entire bore of bushing 10, metallic element 24 and the area surrounding cathode 42 is evacuated.

Obviously many modifications and variations of the present invention are possible in the light of the above teachings. It is therefore to be understood that within the scope of the appended claims the invention may be practiced otherwise than as specifically described.

I claim:

1. In combination, an insulating refractory ceramic circular cylinder, first and second annular metallic members metal-bonded to the respective ends of said ceramic cylinder and extending from the respective ends thereof, a first annular metallic shield whose outside diameter is smaller than the inside diameter of said ceramic cylinder, a second annular metallic shield whose inside diameter is larger than the outside diameter of said ceramic cylinder, the free end of said first member and one end of each of said shields being rigidly and continuously attached together with said first shield and said second shield extending to and overlapping the entire inner side and the entire outer side respectively of the bond between said ceramic cylinder and said first metallic member whereby the bond between said first member and said ceramic cylinder is shielded by said first and second shields, a third annular metallic shield whose inside diameter is larger than the outside diameter of said ceramic cylinder, the free end of said second member and one end of said third shield being rigidly and continuously attached together with said third shield extending to and overlapping the entire outer side of the bond between said ceramic cylinder and said second metallic member whereby the bond between said second member and said ceramic cylinder is shielded by said third shield.

2. In combination, an insulating refractory ceramic circular cylinder, first and second annular metallic members metal-bonded to the respective ends of said ceramic cylinder and extending from the respective ends thereof, a first annular metallic shield whose outside diameter is smaller than the inside diameter of said ceramic cylinder, a second annular metallic shield whose inside diameter is larger than the outside diameter of said ceramic cylinder, both of said shields being longer than said first annular metallic member, cylindrical means coaxially and continuously attached to the free end of said first member and to one end of said first and second shields respectively so that said shields extend to and overlap the entire inside and outside respectively of the bond between said first member and said ceramic cylinder, a third annular metallic shield having at least a portion which is longer than said second annular member and whose inside diameter is larger than the outside diameter of said second annular member, second metallic means in the form of an annulus coaxially and continuously attached to the free end of said second member and to one end of said third shield so that said portion of said third shield extends to and overlaps the entire outside of the bond between said second member and said ceramic cylinder, and a third cylindrical metallic means passing through and metal-bonded to said second means and passing freely through said ceramic cylinder, said first shield, and said first-mentioned means.

References Cited in the file of this patent

UNITED STATES PATENTS 2,132,175    Machlett _____ Oct. 4, 1938

OTHER REFERENCES

Kohl: "Materials Technology for Electron Tubes," 1951, Reinhold Pub. Corp., pages 417–420.